(12) United States Patent
Li et al.

(10) Patent No.: US 8,949,227 B2
(45) Date of Patent: Feb. 3, 2015

(54) SYSTEM AND METHOD FOR MATCHING ENTITIES AND SYNONYM GROUP ORGANIZER USED THEREIN

(75) Inventors: Qiang Li, Beijing (CN); Olof Lundstrom, Jarfalla (SE); Tandy Mai, Chengdu (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 109 days.

(21) Appl. No.: 13/634,182

(22) PCT Filed: Mar. 12, 2010

(86) PCT No.: PCT/CN2010/000307
§ 371 (c)(1),
(2), (4) Date: Sep. 11, 2012

(87) PCT Pub. No.: WO2011/109921
PCT Pub. Date: Sep. 15, 2011

(65) Prior Publication Data
US 2013/0006975 A1    Jan. 3, 2013

(51) Int. Cl.
*G06F 7/00* (2006.01)
*G06F 17/30* (2006.01)
*G06F 17/27* (2006.01)

(52) U.S. Cl.
CPC .................................. *G06F 17/2795* (2013.01)
USPC .......................................... 707/723; 707/748

(58) Field of Classification Search
None
See application file for complete search history.

(56) References Cited

U.S. PATENT DOCUMENTS

| | | | | |
|---|---|---|---|---|
| 6,098,033 A * | 8/2000 | Richardson et al. | ............... | 704/1 |
| 6,845,354 B1 * | 1/2005 | Kuo et al. | ........... | 704/9 |
| 2001/0014868 A1 * | 8/2001 | Herz et al. | ...................... | 705/14 |
| 2005/0065920 A1 * | 3/2005 | He et al. | ............................. | 707/3 |
| 2005/0114324 A1 * | 5/2005 | Mayer | ................. | 707/3 |
| 2007/0282598 A1 * | 12/2007 | Waelti et al. | .................... | 704/10 |
| 2008/0082511 A1 | 4/2008 | Williams | | |
| 2008/0189268 A1 * | 8/2008 | Au | ..................... | 707/5 |
| 2008/0294584 A1 * | 11/2008 | Herz | ............................... | 706/46 |
| 2009/0164890 A1 * | 6/2009 | Zhu et al. | ....................... | 715/257 |
| 2009/0226872 A1 * | 9/2009 | Gunther | ........................ | 434/350 |
| 2009/0327243 A1 * | 12/2009 | Pradhan et al. | .................... | 707/3 |

FOREIGN PATENT DOCUMENTS

CN        1744080 A        3/2006

OTHER PUBLICATIONS

Sobek, Markus., ( "The PageRank Algorithm", eFactory GmbH & Co. KG Internet-Agentur), 2002, 2003, pp. 1-4.*

* cited by examiner

*Primary Examiner* — Tony Mahmoudi
*Assistant Examiner* — Tuan A Pham
(74) *Attorney, Agent, or Firm* — Rothwell, Figg, Ernst & Manbeck, P.C.

(57) ABSTRACT

There is provided a method for managing at least one synonym group, wherein the method comprises the step of: when a synonym group comprises more than one synonym, calculating a similarity value between each two synonyms of all synonyms of the synonym group indicating how similar these two synonyms are to each other. The invention further provided a synonym group organizer, a matching system using the synonym group organizer and the methods thereof.

19 Claims, 12 Drawing Sheets

| Group ID | head part | synonym pointer part | |
|---|---|---|---|
| 101 | Beijing | | |
| 102 | Clean | Tidy / housekeeping / sweep | houseclean / Remove / wash |
| 103 | Family | home | department |

Fig.2a

| Group ID | head part | synonym pointer part | |
|---|---|---|---|
| 102 | Clean | Synoym part | → Tidy → houseclean |
| | | Superclass part | → housekeeping → remove |
| | | Subclass part | → sweep → wash |

SYSTEM AND METHOD FOR MATCHING ENTITIES AND SYNONYM GROUP ORGANIZER USED THEREIN

CROSS REFERENCE TO RELATED APPLICATION(S)

This application is a 35 U.S.C. §371 National Phase Entry Application from PCT/CN2010/000307 filed Mar. 12, 2010, designating the United States, the disclosure of which is incorporated herein in its entirety by reference.

TECHNICAL FIELD

The invention relates to the field of data acquisition and analysis, and in particular to a system and method for determining whether an entity received by a matching system matches previously received entities, and the components used in the system. These components comprise a synonym group organizer for organizing synonyms. The invention further relates to a computer program and a computer program product for implementing the system, method and the components thereof as mentioned above.

BACKGROUND

During the last 5-10 years, "Search" has become a phenomenon in the digital world among people all around the globe. In a typical search situation, a short search query is used to find a large, or at least a larger, document. Typical examples are Internet search engines or search engines installed on library computers for searching articles or books stored in the library.

A traditional search scenario, as described above, is different from a typical match scenario. In a match scenario, two or more users input data into a system for the purpose of finding out whether the data matches the data input by the other user(s). That is, as opposed to a search scenario, all users inputting information into the system are interested in finding matching information. In a search scenario, only the user entering the search query, typically in form of one or several key words, is interested in the match result. From a technical point of view, a matching system differs from a search engine at least in that a matching system has to index the incoming "queries" since the queries are also potential matches for previously or subsequently received queries. In order to distinguish a "match query" from a conventional search query, the data transmitted to a matching system in a "match query" will throughout this document be referred to as an "entity".

A matching system can be used in many different types of matching services. Examples of such services are online job finding/recruitment services, E-commerce services and dating services.

A patent application PCT/EP2008/066617 previously filed by Ericsson discloses such a matching system capable of determining if a first entity received from a client device of a first user matches with at least one of a plurality of entities indexed in an index in which each entity is associated with one or more index points.

An entity may be, e.g., a text file, an image file, an audio file or any other type of data having properties that can be "translated" to words or other sequences of symbols which can serve as index points that are characterizing of the entities associated therewith.

PCT/EP2008/066617 discloses a way to perform entity insertion and search in one single operation to increase the user-perceived quality of the matching service for which the system is used, as well as to reduce the computational capacity needed in the matching systems. It also reduces the time needed to find all potential matches in the system.

In the matching system of the prior art, an entity matches another entity means that the entities have at least one index point in common, i.e. that there is at least one index point in the index with which both entities are associated. However, current matching systems are strict on the criteria for determining whether an entity should be associated with a certain index point or not. In particular, current matching system can not associate a searching entity with entities containing synonyms of the words existed in the searching entity. In other words, current matching systems can not provide more entities which are actually related to the searching entity. For example, when a searching entity contains the expression "tidy up the room", the entity of "home cleaning" which contains the similar meaning of "tidy up the room" can not be considered as the matched one according to current matching systems, which makes current matching systems less applicable.

In addition, the actual meaning of the word is evolving, the new meanings of existing words are created due to the information communication, especially the usage of the Internet all over the world. The matching systems should be flexible enough to reflect the dynamic change of the meanings of the words.

Thus, one problem associated with matching systems according to prior art is how to provide more entities, which have the similar meanings to the searching entity but do not contain the same words of the searching entity as the matched entities, to increase the user-perceived quality of the matching service for which the system is used. Another problem is how to dynamically update the matching systems to reflect the evolved meanings of the words.

SUMMARY

It is an object of the invention to solve or at least mitigate at least one of the above discussed problems for matching systems.

This object is achieved by a method for managing at least one synonym group, each synonym group comprising a first part and a second part, and each synonym group comprising at least one synonym, the first part comprising a synonym being a word standing for a specific category for the synonyms group, and the second part comprising all other synonyms of the synonym group, wherein the method comprises the step of: when a synonym group comprises more than one synonym, calculating a similarity value between each two synonyms of all synonyms of the synonym group indicating how similar these two synonyms are to each other.

According to an embodiment of the present application, the step of calculating the similarity value between each two synonyms comprises the steps of: determining a page rank value for each synonym in the synonym group; calculating a initial similarity value between two synonyms of the synonym group based on the page rank values of these two synonyms; and setting the initial similarity value between these two synonyms as the similarity value between each two synonyms of the synonym group.

According to an embodiment of the present application, the step of calculating the similarity value between two synonyms in the synonym group comprises the steps of: calculating a dynamic similarity value between two synonyms based on a conditional probability of the first one of these two synonyms being used if the second one of these two synonym happens to be used within a session period and a conditional probability of the second synonym being used if the first synonym happens to be used within the session period; and setting the dynamic similarity value between these two synonyms as the similarity value between each two synonyms.

According to an embodiment of the present application, the step of calculating a similarity value comprising the step of setting the similarity value between two synonyms in the synonym group based on the initial similarity value between two synonyms and the dynamic similarity value between these two synonyms.

According to another aspect of the present application, there is provided a synonym group organizer, comprising: at least one synonym group, each synonym group comprising a first part and a second part, and each synonym group comprising at least one synonym, the first part comprising a synonym being a word standing for a specific category for the synonyms group, and the second part comprising all other synonyms of the synonym group, wherein when a synonym group comprises more than one synonyms, said synonym group comprises a similarity value between each two synonyms of all synonyms in the synonym group indicating how similar said two synonyms are to each other; and a manage engine being adapted to perform the method of the present invention.

According to another aspect of the present application, there is provided a matching system comprising: at least one synonym group, each synonym group comprising a first part and a second part, and each synonym group comprising at least one synonym, the first part comprising a synonym being a word standing for a specific category for the synonyms group, and the second part comprising all other synonyms in the synonym group, wherein when a synonym group comprises more than one synonyms, the synonym group comprises a similarity value between each two synonyms of all synonyms in the synonym group indicating how similar said two synonyms are to each other; and at least one entity associated with one or more synonym groups of the at least one synonym group.

According to a further aspect of the present application, there is provided a method for adding a new entity into the matching system, said method comprising the steps of: pre-processing the new entity into at least one of word; and for each word of the new entity: searching for synonym groups containing the synonym corresponding to the word; and associating the new entity with the searched synonym group.

According to a further aspect of the present application, there is provided a method for determining if the first entity received from the client device is matched with at least one entity in the matching system, said method comprising the steps of: pre-processing the first entity into at least one of word; for each word of the first entity: searching for synonym groups containing the synonym corresponding to the word; and searching the entities associated with the searched synonym groups and creating an associated entity collection of the word with each searched entity as an item of the associated entity collection of the word; creating a merged entity collection for the first entity by merging the associated entity collections of each word of the first entity, wherein each item of the merged entity collection being an unique entity and each item containing a counter for counting the number of the unique entity appeared in all associated entity collections of each word; and if the merged entity collection contains any entity item with the value of counter greater than a threshold, then it is determined that the first entity received from the client device is matched, otherwise it is determined that the first entity received from the client device is not matched.

By organizing words using the synonym group organizer, all words with similar meanings can be grouped into one synonym group. When such synonym group is used in connection with a matching system, it is possible to make a link between entities with similar meanings when the association is made on the basis of the synonym group, thus, it is possible to provide more matched entities with similar meanings to the searching entity.

In addition, using the similarity value between two synonyms of a synonym group, it is possible to give a quantity indicating how similar these two synonyms are to each other. It is further possible to compute the similarity between two entities based on the similarity value between two synonyms of a synonym group, which makes it possible to give a reasonable rank of matched entities for a searching entity.

The similarity value between two synonyms of a synonym group may be dynamically modified using the Bayes' theorem based on user behavior statistics of using the synonym group organizer. By dynamically updating the similarity value between two synonyms of a synonym group, it is possible to more correctly reflect the similarity between two synonyms, and it is further possible to update synonyms in a synonym group based on the similarity value between each two synonyms of the synonym group.

More advantageous features of the synonym group organizer and the matching system according to the invention will be described in the description hereinafter and in the appended claims.

Furthermore, the invention relates to a computer program for causing a server node to perform those methods as mentioned above and a computer program product comprising a storage medium on which such a computer program is stored.

BRIEF DESCRIPTION OF THE DRAWINGS

The objects, advantages and effects as well as features of the invention will be more readily understood from the following detailed description of exemplary embodiments of the invention when read together with the accompanying drawings, in which:

FIGS. 2a and 2b illustrates schematically the structure of synonym groups in the synonym group organizer according to embodiments of the invention respectively;

DETAILED DESCRIPTION

Figure 1:
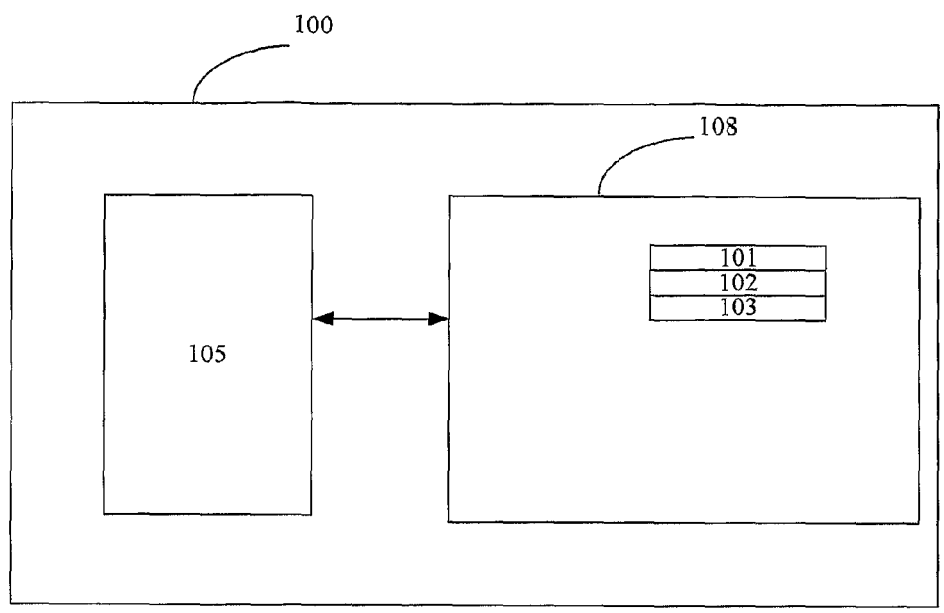
FIG. 1 illustrates an exemplary synonym group organizer according to an embodiment of the invention.

While the invention covers various modifications and alternative constructions, embodiments of the invention are shown in the drawings and will hereinafter be described in detail. However it is to be understood that the specific description and drawings are not intended to limit the invention to the specific forms disclosed. On the contrary, it is intended that the scope of the claimed invention includes all modifications and alternative constructions thereof falling within the scope of the invention as expressed in the appended claims.

FIG. 1 illustrates an exemplary synonym group organizer 100 according to an embodiment of the invention. The synonym group organizer 100 is in this embodiment e server host and comprises at least one of synonym groups (101-103) and a manage engine 105 for managing these synonym groups of the synonym group organizer 100.

These synonym groups may be stored in a database 108 in the synonym group organizer 100, and in practice, the number of synonym groups in a synonym group organizer depends on the language of words used in the synonym group organizer, typically, a synonym group organizer can comprise ten thousands of synonym groups when words used in the synonym group organizer is English.

FIG. 2a illustrates a structure of synonym groups in the synonym group organizer according to an embodiment of the invention. As shown in FIG. 2a, each synonym group 101-103 comprises a first part, hereinafter in the description called head part 110 and a second part, hereinafter in the description called the synonym pointer part 120. The head part 110 comprises a most frequently used word which stands for a specific category for a synonym group, and the synonym pointer part 120 comprises all other synonyms of the word in the head part of the synonym group. Depending on the meaning of a word in the head part 110, the synonym pointer part 120 may not have to comprise any synonym. For example, the synonym group 101 with word "Beijing" in the head part 110 does not comprise any synonym in the synonym pointer part 120, and the synonym group 102 with the word "Clean" in the head part 110 here comprises six synonyms in the synonym pointer part 120.

There may be several ways to organize synonyms in the synonym pointer part 120. In one way, the synonym pointer part 120 can comprise a synonym list with each synonym as an item of the synonym list. In another way, the synonym pointer part 120 can comprise a synonym pointer list with each item pointing to a synonym. In a further way, the synonym pointer part 120 can comprise a linked list, with all synonym linked together by linking one synonym with another. It should be noted that, the invention only requires all synonyms corresponding to the word in the head part being comprised in the synonym pointer part 120, and all manners of organizing these synonyms in the synonym pointer part 120 are within the protection scope of this invention.

FIG. 2b illustrates schematically another structure of the synonym group. According to the semantic definition, word A is a synonym of word B means that word A has exactly or nearly the same meaning as word B, word A is a hypernym of word B means that word A has a broader meaning than that of word B, and word A is a hyponym of word B means that word A has more specific meaning than that of word B. According to an embodiment of the present application, the term "synonym" used throughout the description should comprise all means of "synonym", "hypernym" and "hyponym" of the semantic definition. In FIG. 2b, the structure of synonym group is more reflective to the semantic definition of words, in detail, the synonym pointer part 120 is further divided into three parts: a Synonym part comprising synonyms being words with similar meaning to the word in the head part (corresponding to the term "synonym" of the semantic definition); a Superclass part comprising synonyms being parent words which contain the similar meaning to the word in the head part (corresponding to the term "hypernym" of the semantic definition); and a Subclass part comprising synonyms being extension words from the similar meaning to the word in the head part (corresponding to the term "hyponym" of the semantic definition). A famous synonyms dictionary WordNet (Referring to http://wordnet.princeton.edu/ for the detail) by Princeton University has a similar structure to those defined in connection with FIGS. 2a and 2b, and according to an embodiment of the present invention, those synonym group of a synonym group organizer is derived from such synonyms dictionary.

There are several ways to choose a word among synonyms as the word in the head part 110 of a synonym group. For example, such word can be chosen based on the concrete service or application context, e.g. if it is daily life related service like cleaning, using the most common service category name e.g. "Clean" as the word in the head part; if it is location, using the most common name of the location e.g. "Kista" as the word in the head part; if it is goods or product, also using the most common name e.g. "mobile phone" as the word in the head part. In another way, the word in the head part should be the name has the most appearance or presence according to historical statistics of user data of the synonym group organizer 100. One way may be to calculate page rank (PR) value of each synonym in the synonym group (which will be described in detail in the following description), and choose the one who has the highest PR value in the synonym group as the word in the head part.

The synonym groups may be organized based on Alphabetic order, typically starting from "a", of the word in the head part of the synonym group. It should be noted that, all other organization manner of the synonym groups are within the protection scope of this application providing that such organization manner can make each synonym group searchable within the synonym group organizer.

In order to give a quantity measurement on how similar two synonyms in a synonym group are to each other, each synonym group comprises a similarity value between each two synonyms of all synonyms of a synonym group indicating how similar these two synonyms are to each other. The synonym group organizer manages synonyms of the synonym groups based on these similarity values.

Referring back to FIG. 1, the manage engine 105 is responsible for managing the synonym groups (101-103), that is, calculating the similarity values for each synonym group, updating the similarity values during the practical usage of synonym group organizer, managing the elements of each synonym group during the practical usage of synonym group organizer. The method performed by the manage engine 105 to calculate the similarity value and manage the synonym groups is described in detail in connection with FIGS. 3-7 in the following description.

It should be understood that the illustrated structure of the synonym group organizer 100 is only exemplary and that the synonym group organizer can be implemented in many other ways. For example, the database 108 for storing the synonym groups can be hosted in a dedicated server node, and the manage engine 105 resides in another server in communication the server hosting the database 108 so that all processes made to the synonym groups can be performed by the manage engine 105.

There are several ways to calculate the similarity value between two synonyms in a synonym group. When synonym groups of a synonym group organizer is initially created from a synonyms dictionary, according to an embodiment of the present application, the similarity value between two synonyms in a synonym group can be set to an initial similarity value between two synonyms in a synonym group.

Figure 3:
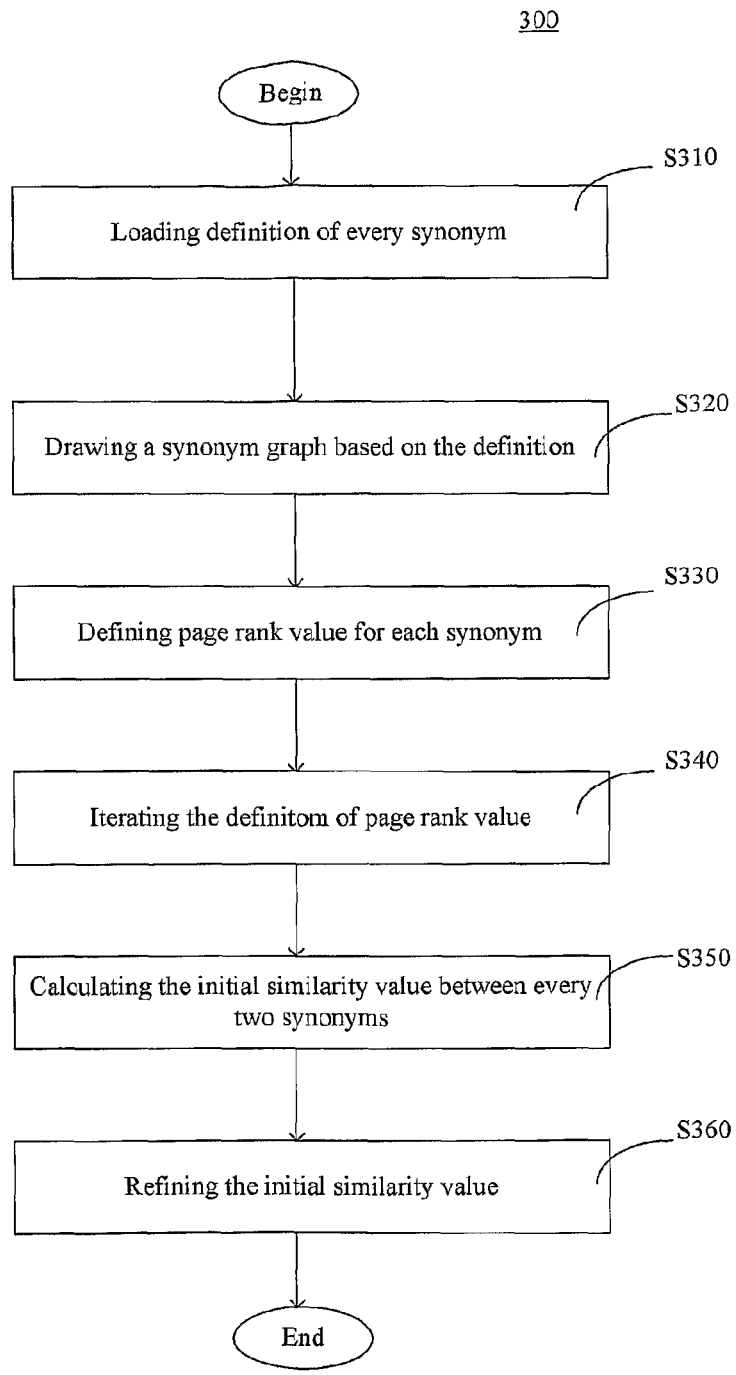
FIG. 3 shows a flow chart diagram illustrating a method for calculating an initial similarity value between two synonyms in a synonym group of a synonym group organizer according to an embodiment of the invention.

FIG. 3 shows a flow chart diagram illustrating a page rank method 300 for calculating an initial similarity value between two synonyms in a synonym group of a synonym group organizer performed by the manage engine 105 according to an embodiment of the invention.

The page rank method 300 is based on the following principles: first of all, if two words A and B are synonyms, there must be several same words in describing their definition, or the two words A and B must be frequently used together to define some other third words; secondly, when it is known that A and B are synonyms, meanwhile if B presents in the definition of A, which means A refers to B, thus B should include A's page rank value.

This method 300 begins with step S310, wherein the definition of every synonym in the synonym groups is loaded from a synonyms dictionary. For example, as for the synonym group 102 of FIGS. 1 and 2, the definitions of each synonym are as following:
1. Clean: make clean by removing dirt, filth, or unwanted substances;
2. Tidy: put (things or places) in good order and cleanliness;
3. Houseclean: clean and tidy up the house;
4. Housekeeping: the work of cleaning and running a house;
5. Remove: remove something concrete, as by lifting, pushing, or taking off, or remove something abstract;
6. Sweep: sweep with a broom, clean by sweeping;
7. Wash: clean with some chemical process, separate dirt or gravel from, remove by the application of water or other liquid and soap or some other cleaning agent.

It can be seen that, in these above mentioned definitions, the synonyms in a synonym group are frequently used to define other synonyms in the same group.

Figure 4:
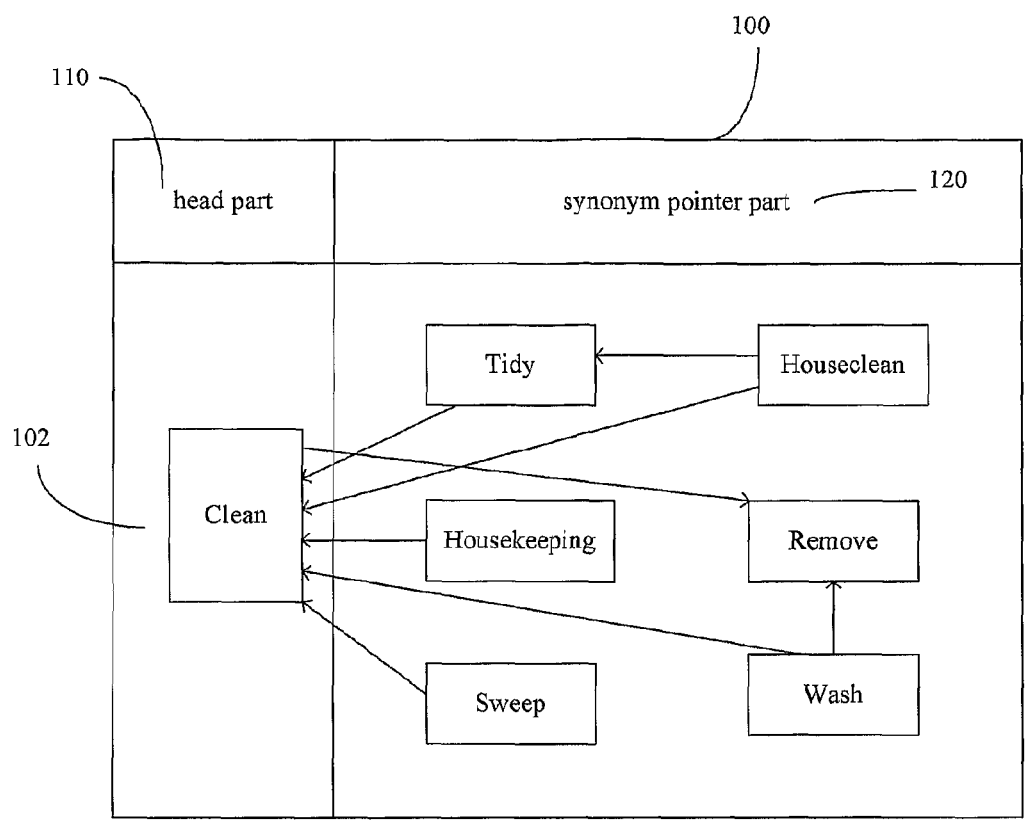
FIG. 4 illustrates a synonym graph used in the method illustrated in FIG. 3.

Then in step S320, a synonym graph which comprises the relation links between synonyms in the same synonym group is derived from the synonym definition. There is a directional link pointing from synonyms A to synonyms B if B appears in the definition of A, and accordingly a page rank value of B should include a page rank value of A. FIG. 4 illustrates a synonym graph of synonym group 102 according to these above mentioned definitions. For example, since the synonym "clean" is appeared in the definition of synonyms "tidy", "houseclean", "housekeeping", "sweep" and "wash", so there are directional links pointing from synonyms "tidy", "houseclean", "housekeeping", "sweep" and "wash" to synonym "clean", and so on. It should be understood that the synonym graph shall not be interpreted as a visual graph that has to be displayed to a user.

In step S330, defining the page rank value of each synonym based on the page rank values of all synonyms appeared in the definition of this synonym, in detail, the page rank value of a synonym is defined as:

$$PR(W)=(1-d)+d(PR(T1)/C(T1)+\ldots+PR(Tn)/C(Tn)) \quad (1)$$

wherein W is the synonym being defined; T1, ... Tn are synonyms appeared in the definition of the synonym W in the same synonym group; PR(T1), ... PR(Tn) are the page rank values of the synonyms T1, ... Tn respectively; C(T1), ... C(Tn) are the number of other synonyms in the same synonym group appeared in the definition of the synonyms T1, ..., Tn respectively; and d is a damping factor set between 0 and 1. In an embodiment, the damping factor d is set to 0.15, so that the page rank value of each synonym can stably converge to an accurate value in the following step S340.

For example, as for the synonym group 102 of FIGS. 1 and 2, the page rank value of each synonym of the synonym group can be defined as:

$$PR(\text{clean})=0.85+0.15*(PR(\text{tidy})+PR(\text{houseclean})/2+PR(\text{housekeeping})+PR(\text{sweep})+PR(\text{wash})/2)$$

$$PR(\text{tidy})=0.85+0.15*(PR(\text{houseclean})/2)$$

$$PR(\text{houseclean})=0.85$$

$$PR(\text{housekeeping})=0.85$$

$$PR(\text{remove})=0.85+0.15*(PR(\text{clean})+PR(\text{wash})/2)$$

$$PR(\text{sweep})=0.85$$

$$PR(\text{wash})=0.85$$

In detail, the synonym "clean" appeared in the definition of synonyms "tidy", "houseclean", "housekeeping", "sweep" and "wash", so the page rank value of "clean" contains the page rank values of synonyms "tidy", "houseclean", "housekeeping", "sweep" and "wash". In addition, according to the above definitions of these synonyms, the numbers of other synonyms appeared in the definition of "tidy", "houseclean", "housekeeping", "sweep" and "wash" are 1, 2, 1, 1, and 2 respectively, which means the value of C(tidy), C(houseclean), C(housekeeping), C(sweep) and C(wash) being set to 1, 2, 1, 1, and 2 respectively. And the same analysis applies to other synonyms as well.

Then in step S340, the initial of unknown page rank value is set to 1 and the defining the page rank value of each synonym is iterated for several times. The more iterations, the more accurate the result would be. According to an embodiment of the present application, the number of iteration is set to log 2(N), wherein N is number of synonyms in the synonym graph. For example, as for the synonym group 102, N=7, and the number of iteration is set to 3. The following table 1 shows the page rank value of each synonym of the synonym group 102 during the iteration.

TABLE 1

The page rank value of each synonym during the iteration

| Iteration | Clean | Tidy | Houseclean | Housekeeping | Remove | Sweep | Wash |
|---|---|---|---|---|---|---|---|
| Initial | 1 | 1 | 0.85 | 0.85 | 1 | 0.85 | 0.85 |
| 1 | 1.31875 | 0.91375 | 0.85 | 0.85 | 0.98875 | 0.85 | 0.85 |
| 2 | 1.305813 | 0.91375 | 0.85 | 0.85 | 1.012656 | 0.85 | 0.85 |
| 3 | 1.305813 | 0.91375 | 0.85 | 0.85 | 1.011686 | 0.85 | 0.85 |

It can be seen from the table 1 that, after 3 rounds of iteration, these page ranks nearly converge to accurate values.

After the page rank value of each synonym has converged to an accurate value, in step S350, the initial similarity value between two synonyms A, B is calculated based on the page rank values of these two synonyms A and B, in detail, the initial similarity value is calculated as:

$$Sim_i(A,B)=(PR(A)+PR(B))/(2+|PR(A)-PR(B)|) \quad (2)$$

wherein A, B are synonyms of a synonym group; PR(A) and PR(B) are the page rank values of synonyms A and B respectively; and $Sim_i(A,B)$ is the initial similarity value between two synonyms A and B.

Table 2 shows the initial similarity value between every two synonyms in the synonym group 102 based on the above mentioned calculation.

TABLE 2 the initial similarity value between every two synonyms

| Sim( ) | Clean | Tidy | Houseclean | Housekeeping | Remove | Sweep | Wash |
|---|---|---|---|---|---|---|---|
| Clean |  | 0.927887 | 0.877841 | 0.877841 | 1.010188 | 0.877841 | 0.877841 |
| Tidy |  |  | 0.854634 | 0.854634 | 0.917776 | 0.854634 | 0.854634 |
| Houseclean |  |  |  | 0.85 | 0.861219 | 0.85 | 0.85 |
| Housekeeping |  |  |  |  | 0.861219 | 0.85 | 0.85 |
| Remove |  |  |  |  |  | 0.861219 | 0.861219 |
| Sweep |  |  |  |  |  |  | 0.85 |
| Wash |  |  |  |  |  |  |  |

Optionally, if the synonym groups are structured as shown in FIG. 2b, that is, the synonym pointer part 120 of a synonym group is further divided into a Synonym part, a Superclass part, and a Subclass part, then the page rank method 300 can further comprise step S360 to refine the initial similarity value between two synonyms A and B in the synonym group $Sim_i(A,B)$ by giving different weights W for the synonyms presented in the head part, Synonym part, the Superclass part, and the Subclass part. In detail, the initial similarity value between two synonyms A and B in the synonym group is further refined as:

$$Sim'_i(A,B)=Sim_i(A,B)*(1-w(A))*(1-w(B)) \quad (3)$$

wherein w(A) and w(B) are a weight factor of synonyms A and B respectively, and
for synonym belongs to the head part, w=0;
for synonyms belong to the Synonym part, w=0;
for synonyms belong to the Superclass part, w=0.2; and
for synonyms belong to the Subclass part, w=0.2.

After the synonym group organizer 100 has been created, it is typically used in a matching system and the matching system can collect the user behavior statistics of using the synonym group organizer. The similarity value between two synonyms in a same synonym group can be dynamically adjusted based on the user behavior statistics of the usage of these two synonyms. For example, if the probability of a user searching for "Housekeeping" and "Houseclean" together within a short timeslot is very high, then it means "Housekeeping" and "Houseclean" is very similar and the corresponding similarity value between them should be high; and if the probability of user searching for "Wash" and "Tidy" together is comparatively low within a short timeslot, then it means they are not so relevant and the corresponding similarity value between them should be low.

The probability can be calculated by Bayes' theorem. In the Bayes' theorem, given a new evidence, the probabilities can be adjusts in the following way:

$$P(H \mid E) = \frac{P(E \mid H)P(H)}{P(E)} \quad (4)$$

wherein
H represents a specific hypothesis, which may or may not be some null hypothesis.

P(H) is called the prior probability of H that was inferred before new evidence, E, became available.

P(E|H) is called the conditional probability of seeing the evidence E if the hypothesis H happens to be true. It is also called a likelihood function when it is considered as a function of H for fixed E.

P(E) is called the marginal probability of E: a priori probability of witnessing the new evidence E under all possible hypotheses. It can be calculated as the sum of the product of all probabilities of any complete set of mutually exclusive hypotheses and corresponding conditional probabilities:

$$P(E)=\Sigma P(E \mid H_i)P(H_i) \quad (5)$$

P(H|E) is called the posterior probability of H given E.

A dynamic similarity value between two synonyms in the synonym group can be calculated by Bayes' theorem based on the usage statistics of these two synonyms. The dynamic similarity value between two synonyms A and B can be calculated based on a conditional probability of synonym A being used if the synonym 13 happens to be used within a session period and a conditional probability of synonym B being used if the synonym A happens to be used within the session period, in detail, the dynamic similarity value is calculated as:

$$Sim_m(A,B)=(P(A|B)+P(B|A))/(2+|P(A|B)-P(B|A)|) \quad (6)$$

wherein $Sim_m(A,B)$ is the dynamic similarity value between two synonyms A and B; $P(A|B)$ is a conditional probability of synonym A being used if the synonym B happens to be used within a session period; and $P(B|A)$ is a conditional probability of synonym B being used if the synonym A happens to be used within the session period. The session period is set to a short timeslot. Typically, the session period can be set to a range from 3 seconds to 30 minutes. In an embodiment, the session value is set to 30 seconds.

Tables 3 and 4 shows the conditional probability and dynamic similarity value between two synonyms in the synonym group 102 based on some usage statistics collected during our experiment.

TABLE 3 conditional probability of each synonym in the synonym group 102

|  | Clean | Tidy | Houseclean | Housekeeping | Remove | Sweep | Wash |
|---|---|---|---|---|---|---|---|
| P(X\|Clean) | 1 | 0.7 | 0.9 | 0.6 | 0.05 | 0.4 | 0.2 |
| P(X\|Tidy) | 0.9 | 1 | 0.8 | 0.6 | 0.05 | 0.2 | 0.3 |
| P(X\|Houseclean) | 0.9 | 0.5 | 1 | 0.4 | 0.1 | 0.8 | 0.4 |
| P(X\|Housekeeping) | 0.6 | 0.5 | 0.8 | 1 | 0.05 | 0.3 | 0.2 |
| P(X\|Remove) | 0.8 | 0.7 | 0.05 | 0.02 | 1 | 0.1 | 0.1 |
| P(X\|Sweep) | 0.9 | 0.7 | 0.9 | 0.6 | 0.5 | 1 | 0.05 |
| P(X\|Wash) | 0.3 | 0.2 | 0.2 | 0.05 | 0.05 | 0.1 | 1 |

TABLE 4

Similarity value between synonyms in the synonym group 102

| Sim( ) | Clean | Tidy | Houseclean | Housekeeping | Remove | Sweep | Wash |
|---|---|---|---|---|---|---|---|
| Clean |  | 0.727273 | 0.9 | 0.6 | 0.309091 | 0.52 | 0.238095 |
| Tidy |  |  | 0.565217 | 0.5238095 | 0.283019 | 0.36 | 0.238095 |
| Houseclean |  |  |  | 0.5 | 0.073171 | 0.809524 | 0.272727 |
| Housekeeping |  |  |  |  | 0.034483 | 0.391304 | 0.116279 |
| Remove |  |  |  |  |  | 0.25 | 0.073171 |
| Sweep |  |  |  |  |  |  | 0.073171 |
| Wash |  |  |  |  |  |  |  |

As the continuous usage of the matching system and the synonym group organizer, the amount of user behavior statistics will grow continuously, the similarity value between two synonyms is much more dependent on the usage statistics of these two synonyms, that is, the dynamic similarity value between two synonyms in the synonym group has more influence on the similarity value between two synonyms than that of initial similarity value.

The similarity value between two synonyms in a synonym group should be influenced by both the initial similarity value and the dynamic similarity value. According to an embodiment of the present invention, the similarity value can be set to:

$$Sim(A,B)=q*Sim_i(A,B)+(1-q)*Sim_m(A,B) \quad (7)$$

wherein $Sim_i(A,B)$ is the initial similarity value between two synonyms A and B; $Sim_m(A,B)$ is the dynamic similarity value between two synonyms A and B; and q is the adjusting factor whose value is between 0~1.

The adjusting factor q is decreasing as the increasing of amount of user usage statistics collected by the matching system, initial value of q is set to 1, and minimum final value of q is set to 0, q can be manually configured based on amount of user behavior statistics of using the synonym group organizer. That is, when the matching system comprising the synonym group organizer is just put to practice, the similarity values is greatly based on the initial similarity value, and the adjusting factor q is set to 1. Whereas as the matching system has been practiced for long times and has collected sufficient usage statistics, the dynamic similarity value will attribute most to the similarity value, and the adjusting factor q is finally set to 0.

Figure 5:
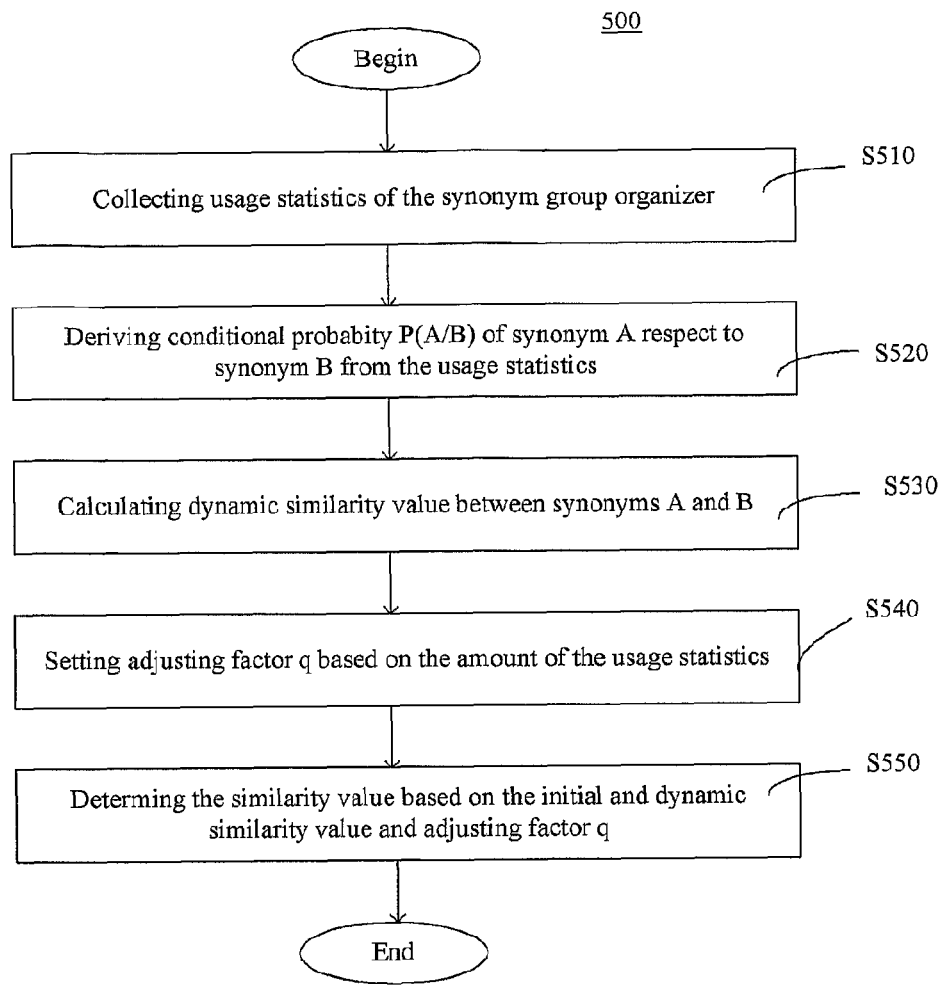
FIG. 5 shows a flow chart diagram illustrating a method for maintaining a similarity value between two synonyms in a synonym group of a synonym group organizer according to an embodiment of the invention.

FIG. 5 shows a flow chart diagram illustrating a method 500 for maintaining a similarity value between two synonyms in a synonym group of a synonym group organizer performed by the manage engine 105 according to an embodiment of the invention.

This method 500 begins with step S510, in which the usage statistics of the matching system, specially the usage statistics of the synonym group organizer is collected. Then in step S520, the usage statistics is analyzed to derive a conditional probability $P(A|B)$ of synonym A with respect to synonym B for all synonyms in each synonym group of the synonym group organizer. In step S530, the dynamic similarity value between two synonyms is calculated based on the conditional probability $P(A|B)$ derived in step S520 and the above mentioned equation (6). Then, the process proceeds to step S540, wherein the adjusting factor q is determined based on the amount of the usage statistics. In step S550, the similarity value between two synonyms in a synonym group is determined according to the above mentioned equation (7) based on the previous determined initial similarity value, dynamic similarity value and the adjusting factor.

It should be noted that, when making analysis to the usage statistics collected by the matching system, not only the conditional probability $P(A|B)$ of synonym A with respect to synonym B of the same synonym group is derived, the conditional probability P(A|B) of synonym A with respect to synonym B of different synonym group is also derived. If two synonyms A and B from different synonym groups are frequently used together within a short timeslot, that is, the conditional probability P(A|B) of synonym A with respect to synonym B of different synonym group is very high, then these two synonyms A and B should have similar meanings, and they should be put in a same synonym group. On the other hand, if the similarity values between one synonym and all other synonyms in a group are too low, which means this synonym is probably not so relevant with the meaning of the synonym group, so it should be kicked out from the synonym group.

Figure 6:
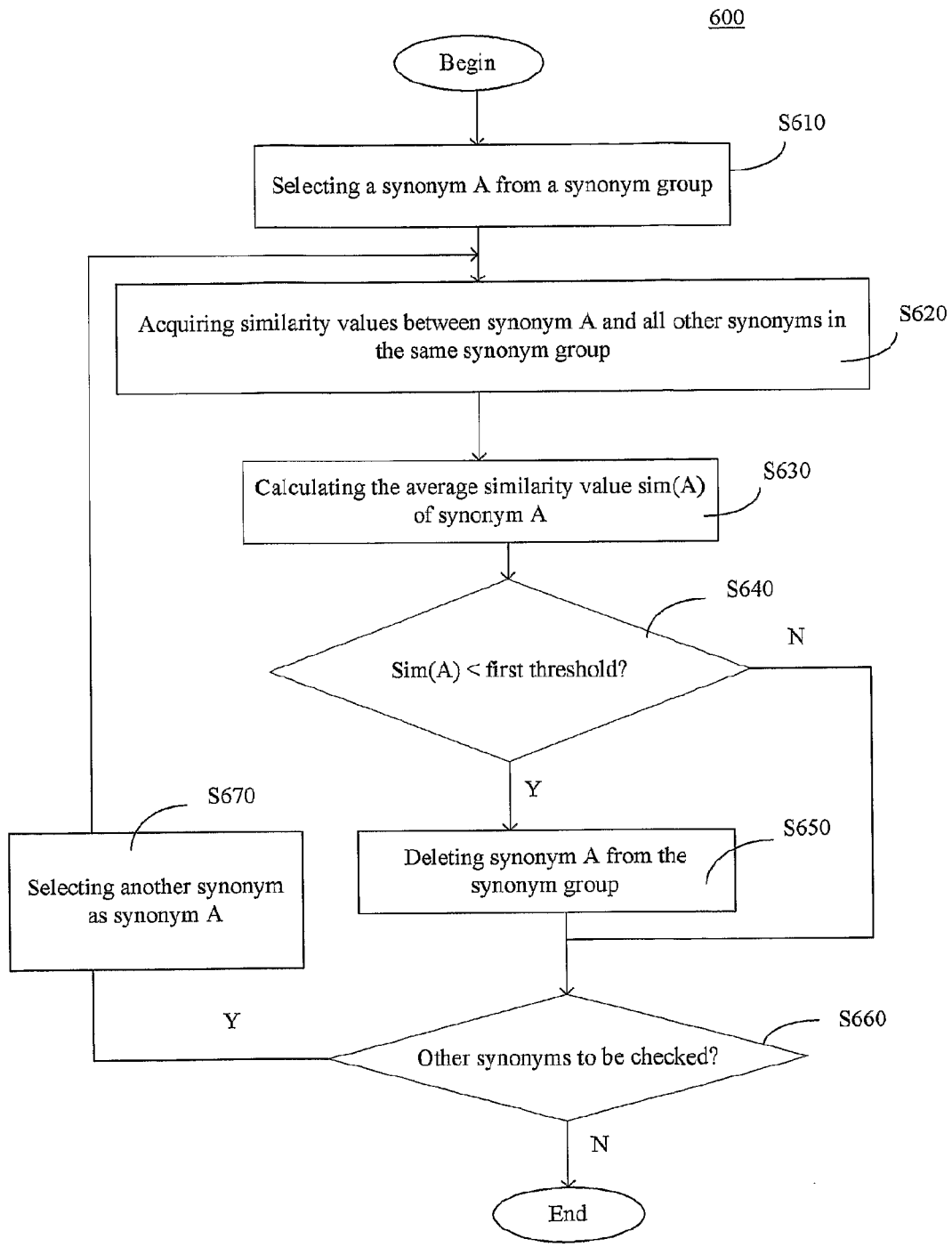
FIG. 6 shows a flow chart diagram illustrating a method for deleting unrelated synonyms from a synonym group according to an embodiment of the invention.

FIG. 6 shows a method 600 for deleting unrelated synonyms from a synonym group performed by the manage engine 105 according to an embodiment of the invention. This method 600 begins with step S610, wherein a synonym A is selected from a synonym group. Then in step S620, the similarity values between synonym A and all other synonyms are acquired. It should be noted that, these similarity values can be calculated according to any methods as described previously. In step S630, the average similarity value of the synonym A is calculated as:

$$Sim(A)=1/M * \Sigma Sim(A,Bj), j=1 \ldots M \quad (8)$$

wherein M is the number of synonyms in the synonym group, Bj is the synonyms in the synonym group. It should be noted that the value of Sim(A, A) is defined as 1.

The process proceeds to step S640, wherein the average similarity value of the synonym A calculated in step S630 is compared with a first threshold. If the average similarity value is lower than the first threshold (range from 0 to 1, in particular, takes value 0.3), then this synonym is deleted from the synonym in step S650, and then proceeds to step S660. In step S660, it is determined whether there are still other synonyms to be checked in the synonym group. If there are synonyms left to be checked, then this method proceeds to step S670 to select another synonym as synonym A from the synonym group and repeats the processes of steps S620 to S660. When all synonyms of a synonym group have been checked completely, then ends the process of method 600.

It should be noted that, if the synonym A being deleted from the synonym group in step S650 is the synonym of the head part, then the synonym with the highest PR value or average similarity value in the synonym pointer part of the synonym group is selected as the synonym of the head part. And optionally, if the synonym A is also synonym of a second synonym group, then all other synonyms in the synonym group can be moved to the second synonym group.

Figure 7:
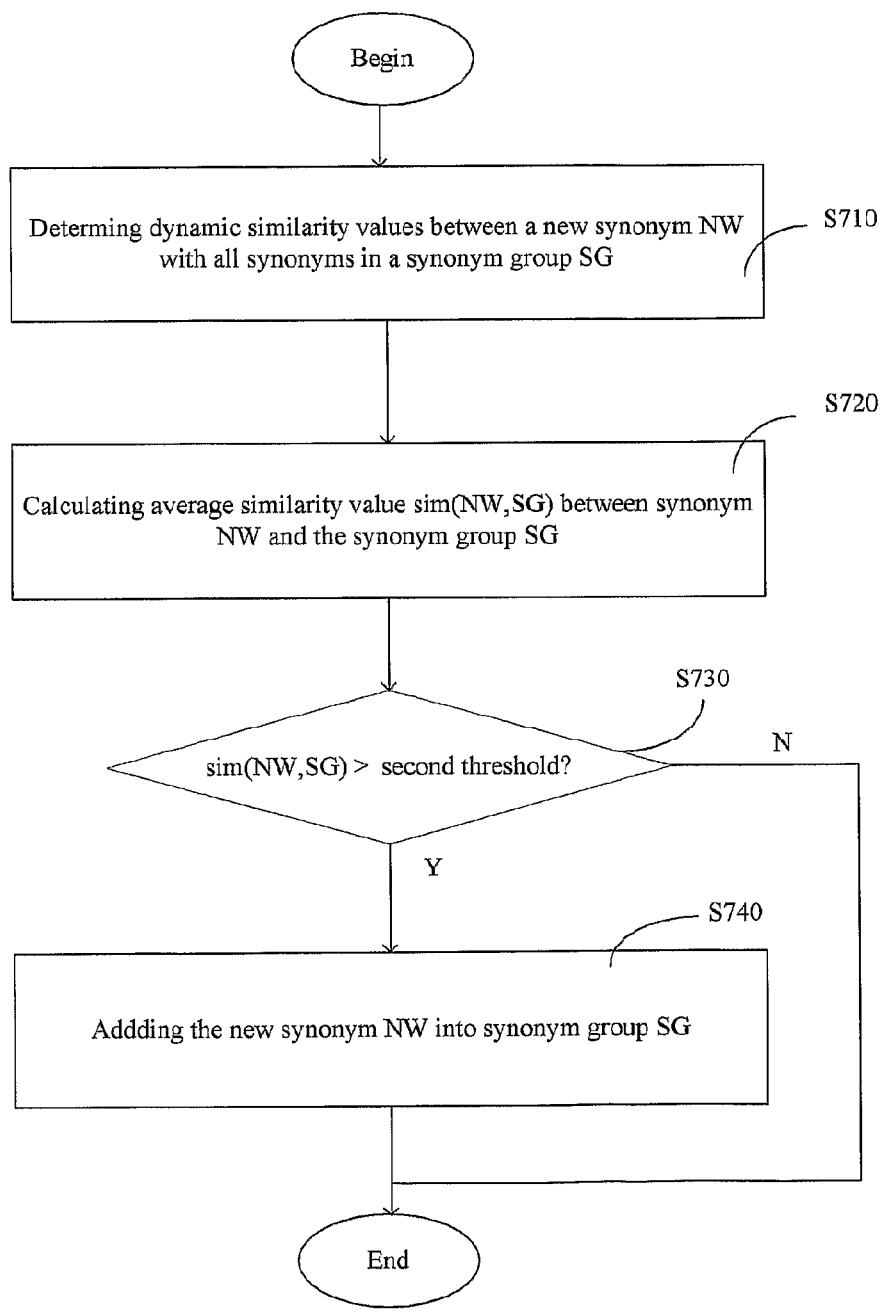
FIG. 7 shows a flow chart diagram illustrating a method for adding a new synonym into a synonym group according to an embodiment of the invention.

FIG. 7 shows a method 700 for adding a new synonym into a synonym group by the manage engine 105 according to an embodiment of the invention. This method 700 begins with step S710, wherein the dynamic similarity values between a new synonym NW and all synonyms of a synonym group SG are calculated according to the equation (6) based on the usage statistics. In step S720, an average similarity value Sim(NW, SG) between the new synonym NW and the synonym group SG is calculated as:

$$Sim(NW,SG)=1/M * \Sigma Sim(NW,Bj), j=1 \ldots M \quad (9)$$

wherein M is the number of synonyms in the synonym group SG, and Bj is the synonyms in the synonym group SG.

In step S730, it is determined whether the average similarity value Sim(NW, SG) between the new synonym NW and the synonym group SG is higher than a second threshold (range from 0 to 1, in particular, takes value 0.6). If the average similarity value Sim(NW, SG) is higher than the second threshold, then in step S740, the new synonym NW is added into the synonym group SG with the dynamic synonym value obtained in step S710 as the similarity value between the new added synonym and all other synonyms in the synonym group.

It should be noted that, the new synonym NW to be added into a synonym group may already belong to another synonym group, or does not belong to any synonym group. However, when adding such new synonym into a synonym group, it is not necessary to deleting such synonym from the previous synonym groups to which the synonym belongs. That is, it is allowable that one synonym is appeared in several synonym groups, and it is further possible that two synonyms can both appeared in different synonym groups.

The detail structure of the synonym group organizer has been described above. In the following, using the synonym group organizer in connection with a matching system for managing entities according to an embodiment of the present invention will be described in detail. As described previously, an entity may be, e.g., a text file, an image file, an audio file or any other type of data having properties that can be "translated" to words or other sequences of symbols which can serve as index points that are characterizing of the entities associated therewith.

Figure 8:
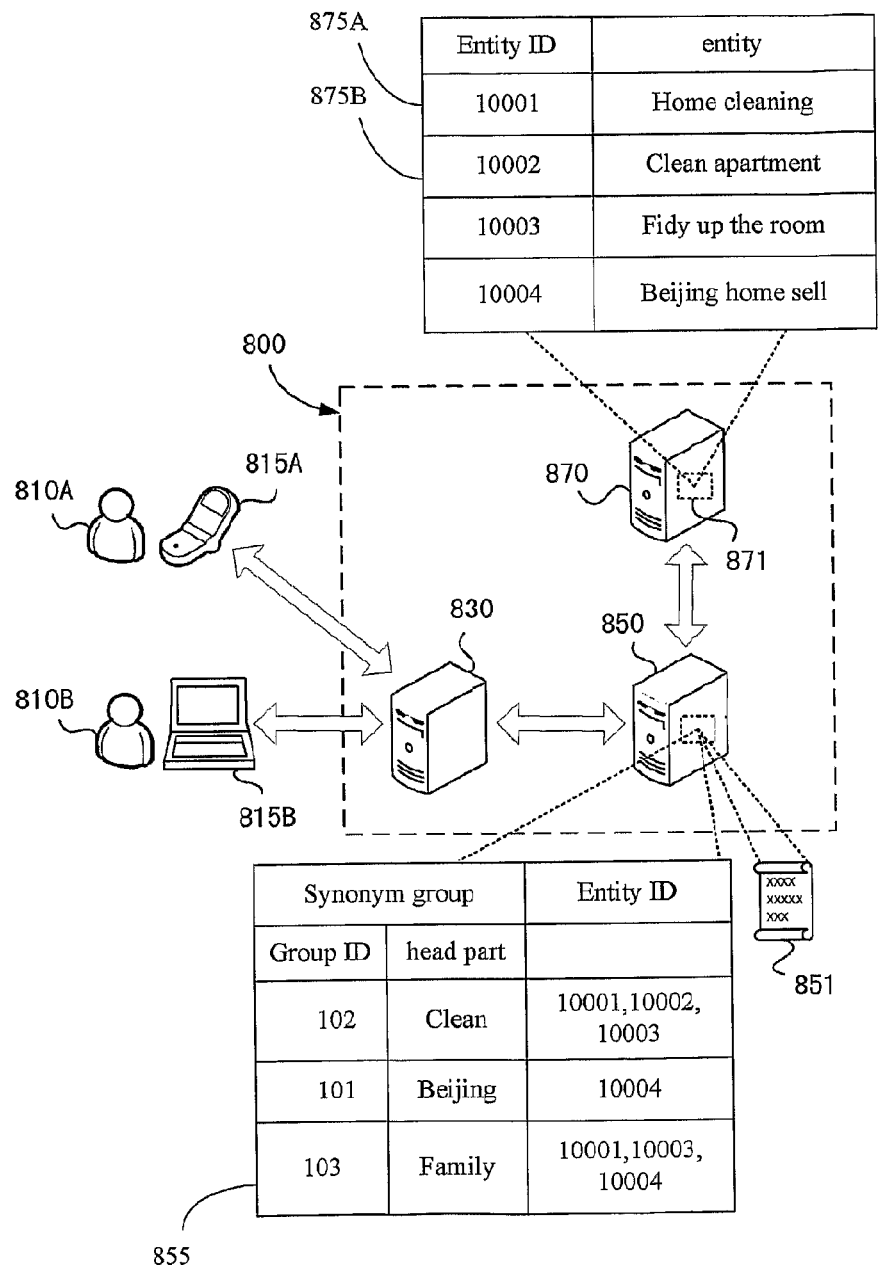
FIG. 8 illustrates an exemplary matching system according to an embodiment of the invention.

FIG. 8 illustrates an exemplary matching system 800 according to an embodiment of the invention. The matching system 800 is adapted to manage the entities received from client devices, which comprises adding an entity received from client device 815A of user 810A into the matching system 800, and determining whether an entity received from client device 815B of user 810B matches with entities previous received and thereby stored in the matching system 800. The matching system 800 comprises a communication server 830, an application server 850 and a database server 870 which are communicatively connected in order to exchange data as illustrated by the bidirectional arrows in the drawing.

The users 810A, 810B typically access a matching service hosted by the matching system 800 over the Internet via their client devices 815A, 815B. The communication server 830 is responsible for handling the communication with the client devices 815A, 815B. In one embodiment, the communication server 830 may be a web server, and the communication between the client devices 815A, 815B and the communication server 830 is based on HTTP related protocol.

The database server 870 comprises a database 871, which stores all entities received by the matching system 800. When a new entity is stored in the database 871, it is assigned an entity identification parameter 875A, 875B uniquely identifying that entity. The database 871 thus functions as an entity storage and the entity identification parameters 875A, 875B are the keys to find the entities in the entity storage. The entity identification parameters 875A, 875B will hereinafter be referred to as Entity IDs.

The application server 850 comprises a matching engine 851, which comprises all functionality needed to add a new entity into the matching system and determine if an entity received from a client device is matched with the previous received entities in the matching system. The application server 850 also comprises an enhanced synonym group organizer 855. The enhanced synonym group organizer 855 is quite similar to the synonym group organizer as described above except that, the synonym group of the enhanced synonym group organizer further comprises a entity part indicating all entities associated with the synonym group to facilitate the search for matching entities. In an exemplary embodiment, the entities are text strings and the entity part of the synonym group of the enhance synonym group organizer 855 contains a list of the Entity IDs 875A, 875B of the entities associated with the synonym group. In the enhanced synonym group organizer 855, one entity is associated with one or more synonym groups. An entity can be said to match another entity, at least to some extent, if they are both associated with several common synonym groups. Although the enhanced synonym group organizer 855 in this embodiment resides in the application server 850, the enhanced synonym group organizer 855 may just as well be resided in another node in the matching system 800 like the synonym group organizer 100 of FIG. 1. How the enhanced synonym group organizer 855 being located should not be interpreted as a limiting feature of the matching system 800 according to the invention.

It should be noted that, in the matching system 800, the matching engine 851 performs all functions related to the entity, which may also involves modifying the synonym group (for example, the entity part of the synonym group) of the enhanced group organizer 855, while the enhanced synonym group organizer 855 may also comprise a manage engine for managing the synonym groups. In an embodiment of the present invention, the matching engine 851 and the manage engine of the enhanced synonym group organizer can be combined together to form a new matching engine so that all operations related to the synonym group can be executed by the new matching engine. In another embodiment, the enhanced group organizer 855 can be merged into the matching system, which means that the database for storing the synonym groups become a standard component of the matching system, the functions of manage engine is merged into matching engine 851. How the components of the matching system being organized should not limit the protection scope of the present application.

It should be understood that the illustrated matching system architecture is only exemplary and that the matching system 800 can be implemented in many other ways. For example, the communication server 830 and/or the database server 870 may be included in the application server 850 such that the entire matching system 800 resides within one single server node.

Figure 9:
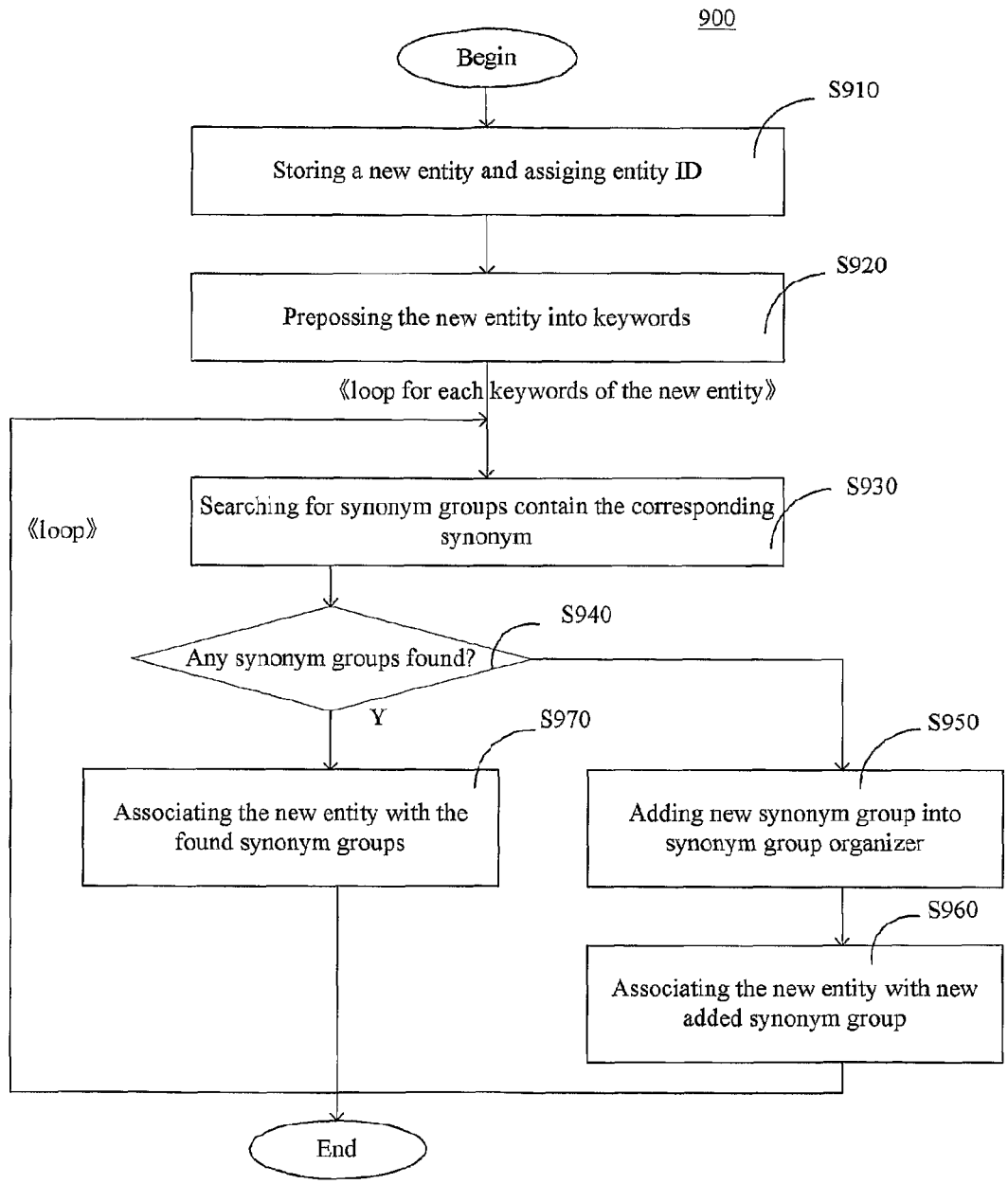
FIG. 9 shows a flow chart diagram illustrating a method for adding new entity into the matching system according to an embodiment of the invention.

FIG. 9 shows a method 900 for adding a new entity into the matching system according to an embodiment of the invention. Method 900 can be executed by the matching engine 851 of the matching system and this method begins with step S910, wherein a new entity is added into the data server and assigned an entity ID.

In step S920, before further processing the new entity, the text of the new entity should be pre-processed. The pre-process may include removing unnecessary characters, e.g. the special character '.' at the end of the text, and segmenting the text of the new entity into keywords. For example, the keywords will be recognized and segmented by Lucene API (Open source search software, http://lucene.apache.org/). For example, a new entity with text "home cleaning" will be segmented into keywords "home" and "cleaning".

For each keyword recognized from the new entity, in step S930, searching in the synonym group organizer for the synonym groups with synonyms corresponding to the key word. There are several ways to determine whether a synonym corresponds to the keyword. For example, a synonym is considered to be correspondent to the keyword if the synonym and keyword are the same, or the synonym contains all characters of the keyword, or the keyword contains all characters of the synonym. All these ways are within the protection scope of the present application.

In step S940, it is determined whether there are any synonym groups found. If it is found, then in step S970, associate the new entity with those found synonym groups, which may include the step of associating the entity ID of the new entity with each one of the found synonym groups. If no synonym group found, then in step S950, adding a new synonym group with head part being set as the keyword into the synonym group organizer, and in step S960, associating the new entity with the new added synonym group.

Steps S930 to S970 are repeated for each keyword of a new entity. After all keywords of the new entity have been processed, the process of adding a new entity is completed.

For example, with regard to synonym group organizer shown in FIGS. 1 and 2, new added entities "home cleaning" and "tidy up the room" are processed to be associated with the synonym group "clean".

Figure 10:
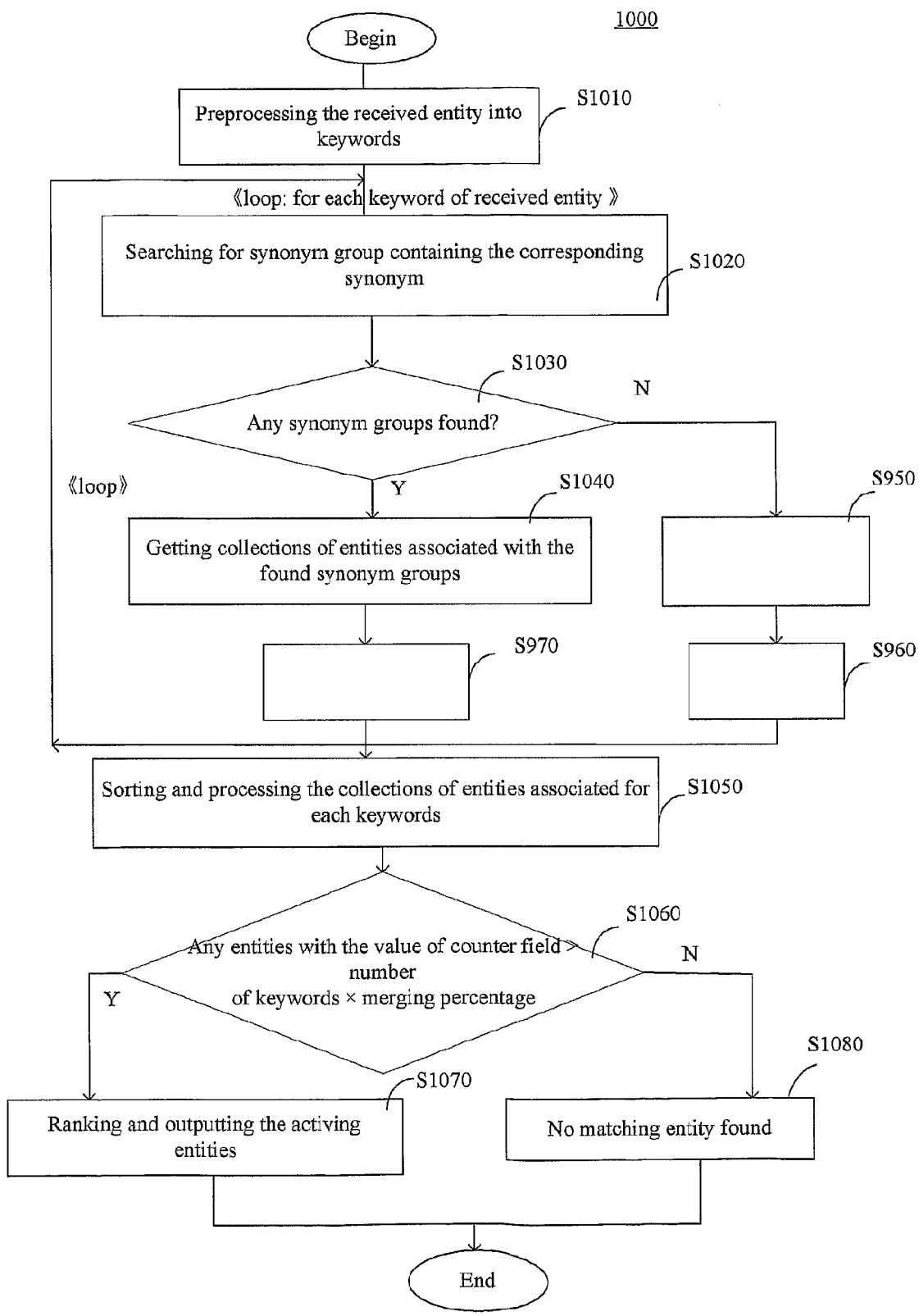
FIG. 10 shows a flow chart diagram illustrating a method for determining if a first entity received from a client device is matched with at least one entity in the matching system according to an embodiment of the invention.

FIG. 10 shows a method 1000 for determining if an entity received from a client is matched with at least one entity in the matching system according to an embodiment of the invention. Method 1000 can be executed by the matching engine 851 of the matching system and this method 1000 begins with step S1010, which is similar to the process as mentioned in Step S920 of FIG. 9, wherein the received entity is divided into several keywords. If it is possible to adding the entity received from the client into the matching system and determining whether the received entity is matched with entities in the matching system simultaneously, then step S910 can be performed before step S1010.

For each keyword of the received entity, in step S1020, searching in the synonym group organizer for the synonym groups with synonyms corresponding to the keyword. There are several ways to determine whether a synonym corresponds to the keyword. For example, a synonym is considered to be correspondent to the keyword if the synonym and keyword are the same, or the synonym contains all characters of the keyword, or the keyword contains all characters of the synonym. All these ways are within the protection scope of the present application.

Then in step S1030, it is determined whether any synonym groups have been found. If there are no synonym groups found, it is optional to adding a new corresponding synonym group, and if the received entity is stored in the data server, then associating the received entity with the new added synonym group. Such processes are similar to those steps S950 and S960 in FIG. 9. For the sake of simplicity, the details of these processes are neglected.

If there are any synonym groups found in step S1030, then in step S1040, getting collections of entities associated with the found synonym groups. If the received entity is stored in the data server, then method optionally contains a step similar to step S970 in method 900 for further associating the received entity with the found synonym groups.

After looping for each keyword of the received entity, then the collections of entities associated with synonym groups corresponding to each keyword of the received entity are obtained. Then, in the following steps, those collections of entities should be processed. According to one embodiment of the present application, a first entity is considered as matched with a second entity when a large portion of keywords constituting the first entity is within the same synonym group as those keywords constituting the second entity. In detail, when for all keywords constituting the first entity, the second entity is found in the collection of the associated entities in step S1040, then the first and second entity is called fully matched. When only for parts of keywords constituting the first entity, the second entity is found in the collection of the associated entities in step S1040, then the first and second entity is called partial matched. For example, in the synonym group organizer of FIG. 8, entity "home cleaning" is fully matched with the entity "clean apartment" due to keywords "home" and "cleaning" of entity "home cleaning" are all in the synonym groups with which the entity "clean apartment" is associated. Entity "beijing home cleaning" is partially matched with the entity "clean apartment" due to the keyword "beijing" is not appeared in any synonym group with which the entity "clean apartment" associated. If the matching portion between two entities are too low, then these two entities are deems as not matched. For example, if only 50% percentage of the keywords of the first entity are matched the second entity, then these two entity should not be considered as matched. According to an embodiment of the present invention, a matching percentage should be defined so that only a first entity with the matched keywords above the matching percentage of all keywords should be deemed as matching with the second entity. In this embodiment, the matching percentage is set to any value in the range of 51-100%, and is preferred set to 80%.

Returning to method 1000, in step S1050, the collections of entities associated with synonym groups corresponding to each keyword of the received entity are processed to get a merged entity collection for the received entity. In details, these collections of entities are merged into one collection of entities wherein only unique entity is appeared as an item of the merged collection and no two items of the merged collection comprise the same entity. Each entity in the merged collection has an additional field of counter for counting the number of appearance of entities appeared in those collections of entities obtained after looping through the keywords of the received entity.

In step S1060, it is determined whether there are any entities in the merged collection with the value of the counter field greater than (the number of keyword of the received entity*the matching percentage), that is, whether there are any entities deemed as being matched by the received entity. If no entity found, then returning the information regarding no matched entity found to the client in step S1080 and ending the process. If there are any entities found, then ranking those found entities based on the similarity between the received entity and each one of those found entities and outputting the ranked entities to the client in step S1070.

The detail process of determining the similarity between the two entities in step S1070 is further explained in connection with FIG. 11.

Figure 11:
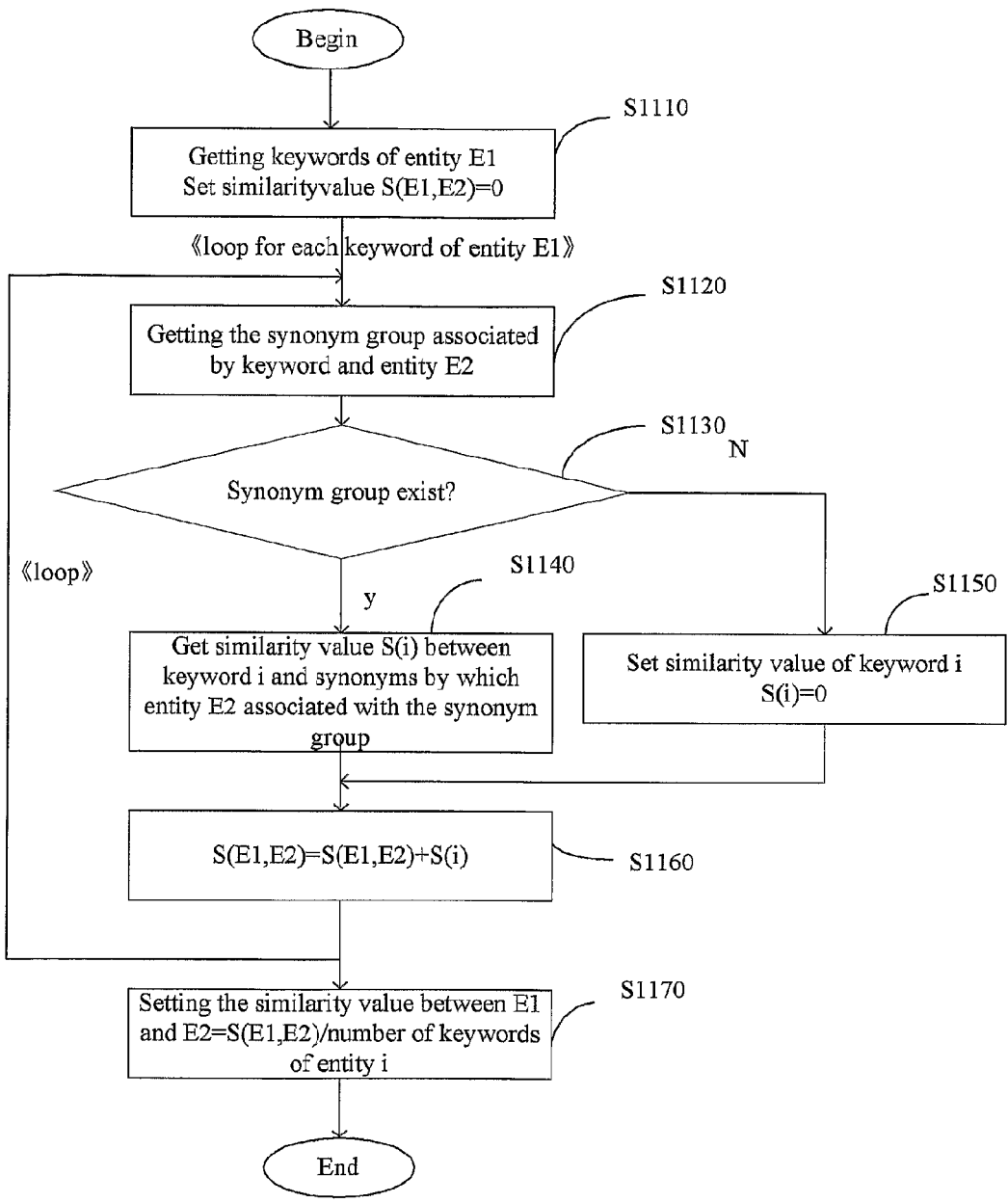
FIG. 11 shows a flow chart diagram illustrating a method for calculating a similarity between two matched entities according to an embodiment of the invention.

FIG. 11 shows a method 1100 for calculating a similarity S(E1, E2) between two matched entities E1 and E2 according to an embodiment of the invention. This method begins with step S1110, wherein all keywords of entity E1 is acquired and the initial value of the similarity S(E1, E2) is set to 0. Then the method 1100 proceeds with looping for each keyword i of entity E1.

In step S1120, acquiring the synonym group which contains the synonym corresponding to keyword i and with which the entity E2 associated. Due to the fact that the entities E1 and E2 may be partially matched, it is possible that there does not exist any synonym group which contains both synonym corresponding to keyword i and synonym corresponding to any keyword of entity E2.

In step S1130, it is determined whether such synonym group exists. If not exist, then the method proceeds to Step S1150, wherein the similarity value S(i) for keyword i is set to 0. If such synonym group exists, then in step S1140, the similarity value between the synonym corresponding to keyword i and the synonym by which the entity E2 is associated with the synonym group is acquired, and the similarity value S(i) for keyword i is set to the similarity value between two synonym.

It is also possible that more than one synonym groups can be found in step S1120, that is, there are more than one synonym groups which contain both synonym corresponding to keyword i and synonym corresponding to any keyword of entity E2. In this case, it is preferred to get all similarity values between two synonym for all entity groups found in step S1120, and set the similarity value S(i) for keyword to the highest similarity values among all entity groups.

In step S1160, the similarity S(E1, E2) between two matched entities E1 and E2 is added by the similarity value S(i) for keyword i. After processing for each keywords of entity E1, then in step S1170, dividing the summed similarity S(E1, E2) by the number of keywords of entity E1 to get the final similarity S(E1, E2) between two entities E1 and E2.

It should be noted that in the matching system 800, the components therein are logically divided dependent on the functions to be achieved, but this invention is not limited to this, the respective components in the matching system 800 can be re-divided or combined dependent on the requirement, for instance, some components may be combined into a single component, or some components can be further divided into more sub-components.

Embodiments of the present invention may be implemented in hardware, or as software modules running on one or more processors, or in a combination thereof. That is, those skilled in the art will appreciate that special hardware circuits such as Application Specific Integrated Circuits (ASICs) or digital signal processor (DSP) may be used in practice to implement some or all of the functionality of all component of the matching system 800 according to an embodiment of the present invention. Some or all of the functionality of the components of the matching system 800, including the matching engine 851, may alternatively be implemented by a microprocessor in the application server 850 in combination with e.g. a matching engine computer program corresponding to the matching engine 851, which matching engine computer program when run on the microprocessor causes the application server to perform, for example, the steps mentioned in conjunction with FIGS. 9 and 10. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

Figure 12:
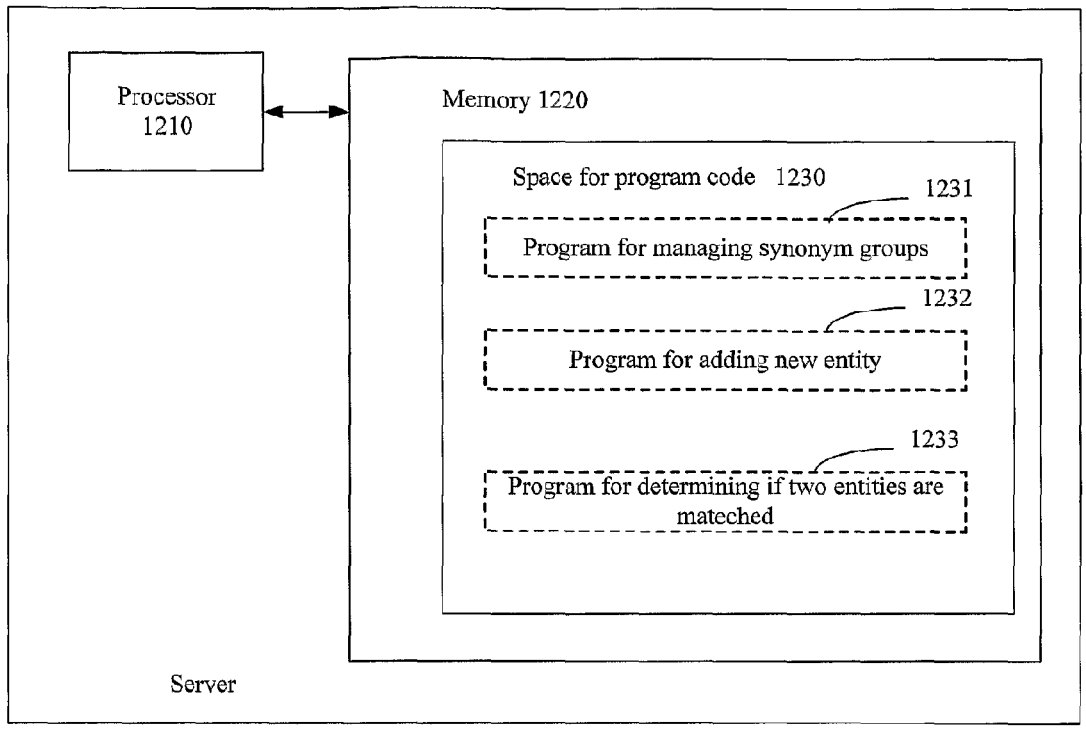
FIG. 12 shows a block diagram illustrating a typical server for implementing the embodiment of the invention.
Figure 13:
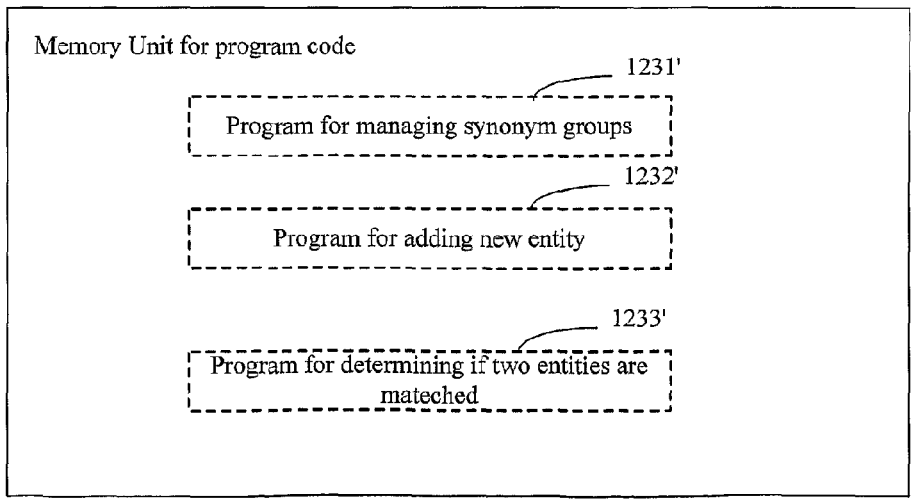
FIG. 13 shows a schematic of a memory unit holding or carrying program code for use by a server.

For example, FIG. 12 shows a server, e.g. an application server, which can implement the embodiment of the present application, the server can comprise in the conventional way a processor 1210 and a computer program product/computer readable medium in the form of a memory 1220. The memory 1220 may be an electronic memory such as a flash memory, an EEPROM (Electrically Erasable Programmable Read-only memory), an EPROM (Erasable Programmable Read-only memory), a hard disc or an ROM. The memory 1220 can have spaces for program code 1230 for performing any method steps described previously. For example, the space for program code 1230 may comprise program 1231 for managing the synonym groups as described previous in connection with FIGS. 3-7, program 1232 for adding a new entity into the matching system as described previous in connection with FIG. 9, and program 1233 for determining if an entity received from a client is matched with at least one entity in the matching system as described previous in connection with FIG. 10. The program code can have been written to and can be or have been read from one or more computer program products, i.e. program code carriers, such as a hard disc, a compact disc (CD), a memory card or a floppy disc. Such a computer program product is generally a memory unit that can be portable or stationary as illustrated in the FIG. 13. It can have memory segments, memory cells and memory spaces arranged substantially as in the memory 1220 of the server of FIG. 12. The program code can e.g. be compressed in a suitable way. Generally, the memory unit thus comprises computer readable code, i.e. code that can be read by an electronic processor such as 1210, which when run by a server causes the server to carry out steps for executing one or more of the procedures or procedural steps that the server performs according to the description above.

It should be noted that the aforesaid embodiments are illustrative of this invention instead of restricting this invention, substitute embodiments may be designed by those skilled in the art without departing from the scope of the claims enclosed. The word "include" does not exclude elements or steps which are present but not listed in the claims. The word "a" or "an" preceding the elements does not exclude the presence of a plurality of such elements. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

The invention claimed is:

1. A computer-implemented method for managing a synonym group, the synonym group comprising a first part, a second part, and a plurality of synonyms, the first part comprising a synonym being a word standing for a specific category for the synonym group, and the second part comprising all other synonyms of the synonym group, wherein the method comprises the step of:
    calculating a similarity value between each two synonyms of all synonyms of the synonym group indicating how similar these two synonyms are to each other, wherein the step of calculating the similarity value between each two synonyms comprises the steps of:
    determining a word rank value for each synonym in the synonym group;
    calculating an initial similarity value between two synonyms of the synonym group based on the word rank values of these two synonyms; and
    setting the initial similarity value between these two synonyms as the similarity value between each two synonyms of the synonym group.

2. The method according to claim 1, further comprising the step of: setting the synonym having the highest word rank value among all synonyms in the synonym group as the synonym in the first part of the synonym group.

3. The method according to claim 1, further comprising the steps of:
    calculating an average similarity value for each synonym of a synonym group based on the similarity values between a first synonym and all other synonyms in the synonym group; and
    if the average similarity value of the first synonym is lower than a first threshold, then removing the first synonym from the synonym group.

4. The method according to claim 3, further comprising the step of: if the first synonym is the synonym in the first part of the synonym group and the first synonym being a synonym of a second synonym group, then moving all other synonyms in the synonym group to the second synonym group.

5. The method according to claim 1, further comprising the steps of:
    calculating an average similarity value with respect to a synonym group for a word, the average similarity value with respect to the synonym group being calculated based on the similarity values between the word and all synonyms in the synonym group; and
    if the average similarity value is higher than a second threshold, then adding the word into the synonym group.

6. The method of claim 1, further comprising
    pre-processing an entity in the form of a query into at least one word; and
    for each word processed from the entity:
        searching for synonym groups containing the synonym corresponding to the word; and
        associating the entity with the searched synonym group.

7. The method according to claim 6, wherein pre-processing the entity into at least one word further comprises the steps of:
    removing unnecessary words from the entity;
    recognizing at least one keyword in the entity; and
    segmenting the entity into at least one word corresponding to the at least one keyword.

8. The method according to claim 6, wherein if there is no synonym group containing the synonym corresponding to the word being searched, then the method further comprises the steps of:
    adding a new synonym group with the head part set as the word into the synonym group organizer; and
    associating the entity with the new synonym group.

9. The method of claim 1, further comprising:
    determining if a first entity in the form of a first query received from a client device is matched with a second entity in the form of a second query, said method comprising the steps of:
    pre-processing the first entity into at least one word;
    for each word processed from the first entity:
        searching for synonym groups containing the synonym corresponding to the word; and
        searching entities associated with the searched synonym groups and creating an associated entity collection of the word with each searched entity as an item of the associated entity collection of the word;
    creating a merged entity collection for the first entity by merging the associated entity collections of each word of the first entity, each item of the merged entity collection being a unique entity and each item containing a counter for counting the number of the unique entity appearing in all associated entity collections of each word; and
    if the merged entity collection contains any entity item with the value of counter greater than a threshold, then it is determined that the first entity received from the client device is matched, otherwise it is determined that the first entity received from the client device is not matched.

10. The method of claim 1, wherein the similarity value between the two synonyms, in a same synonym group, is dynamically adjusted based on user behavior statistics of the usage of the two synonyms.

11. The method of claim 1, wherein the similarity value is refined by giving different weights for synonyms in a head part, a synonym part, a superclass part, and a subclass part.

12. The method of claim 1, wherein the similarity value is a dynamic similarity value based on a conditional probability of a first synonym being used if a second synonym is used within a session period.

13. An apparatus for managing a synonym group, the synonym group comprising a first part, a second part, and a plurality of synonyms, the first part comprising a synonym being a word standing for a specific category for the synonym group, and the second part comprising all other synonyms of the synonym group, the apparatus comprising:
 a processor and a memory, the memory containing instructions executable by the processor whereby the apparatus is operative to:
 calculate a similarity value between each two synonyms of all synonyms of the synonym group indicating how similar these two synonyms are to each other, wherein the step of calculating the similarity value between each two synonyms comprises the steps of:
 determining a word rank value for each synonym in the synonym group;
 calculating an initial similarity value between two synonyms of the synonym group based on the word rank values of these two synonyms; and
 setting the initial similarity value between these two synonyms as the similarity value between each two synonyms of the synonym group.

14. A matching system comprising:
 an apparatus for managing a synonym group, the synonym group comprising a first part, a second part, and a plurality of synonyms, the first part comprising a synonym being a word standing for a specific category for the synonym group, and the second part comprising all other synonyms in the synonym group, the apparatus comprising a processor and a memory, the memory containing instructions executable by the processor whereby the apparatus is operative to:
 calculate a similarity value between each two synonyms of all synonyms in the synonym group indicating how similar said two synonyms are to each other; and
 receive at least one entity associated with one or more synonym groups of the at least one synonym group, wherein the step of calculating the similarity value between each two synonyms comprises the steps of:
 determining a word rank value for each synonym in the synonym group;
 calculating an initial similarity value between two synonyms of the synonym group based on the word rank values of these two synonyms; and
 setting the initial similarity value between these two synonyms as the similarity value between each two synonyms of the synonym group.

15. The matching system according to claim 14, wherein the synonym group further comprises a entity indicating all entities associated with the synonym group.

16. The matching system according to claim 14, wherein the matching system comprises a matching engine configured to add a new entity into the matching system and determine if a first entity received from a client device is matched with the at least one entity in the matching system.

17. The matching system according to claim 16, wherein the matching engine is configured to add a new entity into the matching system by:
 pre-processing the new entity into at least one of word; and
 for each word of the new entity:
 searching for synonym groups containing the synonym corresponding to the word; and
 associating the new entity with the searched synonym groups.

18. The matching system according to claim 17, wherein the matching engine is configured to pre-process the new entity into at least one of words by:
 removing unnecessary word from the new entity;
 recognizing at least one keywords in the new entity; and
 segmenting the new entity into at least one word corresponding to the at least one keyword.

19. The matching system according to claim 17, wherein if there is no synonym group containing the synonym corresponding to the word being searched, then the matching engine is configured to:
 add a new synonym group with the first part set as the word into the synonym group organizer; and
 associate the new entity with the new synonym group.

* * * * *